3,076,036
CATALYTIC HYDRATION OF OLEFINS
Waldemar H. Hansen, Woodbury, N.J., assignor to Socony Mobil Oil Company, Inc., a corporation of New York
No Drawing. Filed Dec. 29, 1959, Ser. No. 862,464
9 Claims. (Cl. 260—641)

This invention relates to a process for the catalytic hydration of olefins having three to five carbon atoms to produce alcohols. More particularly, the present invention is concerned with hydration of such olefins in the presence of a novel catalyst capable of producing high yields of the desired alcohols.

It has heretofore been suggested that various porous adsorptive solids be used for the catalytic hydration of olefins in the production of alcohols. Thus, natural and synthetic composites of silica with oxides of one or more metals of groups IIIb and IVa of the periodic table have been suggested as suitable catalysts for the hydration of olefins. Of this group, composites of silica and alumina of either natural or synthetic origin because of their ready availability and low cost have been of primary interest. The foregoing adsorptive composites, however, are in general active for catalyzing a variety of hydrocarbon conversion reactions including those involving polymerization, cracking and hydrogen transfer which result in undesired formation of polymers, saturated hydrocarbons, and carbonaceous deposits at the expense of desired olefin formation. Various other side reactions catalyzed by the above siliceous composites result in formation of oxygenated compounds such as ketones and other by-products.

As will be apparent, the commercial feasibility of catalytic hydration of olefins to produce alcohols is dependent upon ability to obtain conversions of olefins to reasonable amounts of alcohols without degradation of the olefin not consumed in the production of alcohols to byproducts of little or no value compared to the charge stock and desired product. The promotion of undesirable side reactions with the previously employed catalysts has heretofore been recognized and various solutions to such problem have been offered. One procedure recommended, with some success, has involved preconditioning the catalyst by contact with water prior to bringing the same into contact with the olefin charge. Such suggested method, however, has the disadvantage of requiring a separate treating step and necessitating the carrying out of such step under closely controlled conditions.

It is a principal object of the present invention to provide an improved method for the catalytic hydration of olefins to alcohols. A further object is the provision of an improvement in the catalytic hydration of olefins having three to five carbon atoms to the corresponding alcohols. A still further object is to provide a selective and efficient method for catalytically converting such olefins to alcohols with a minimum accompanying formation of undesired byproducts.

The above and other objects which will be apparent to those skilled in the art are achieved in accordance with the process of this invention. Broadly, the method of the invention provides for the hydration of olefins having three to five carbon atoms in the presence of a catalyst consisting essentially of a minor proportion of molybdenum oxide combined with a composite of silica and an oxide of at least one metal selected from those of groups IIIb and IVa of the periodic table. As utilized in the present specification and claims, the metals of groups IIIb and IVa are those shown in the periodic table on page 411 of "A Text-Book of Inorganic Chemistry," by J. R. Partington, fifth edition, published by Macmillan and Co., Limited. It has been discovered, in accordance with the present invention, that the presence of molybdenum oxide in the above catalysts results in increased activity and high selectivity in effecting desired hydration of olefins having three to five carbon atoms to alcohols.

The catalysts utilized herein consist essentially of between about 0.5 and about 25 percent by weight of molybdenum oxide ($MoO_3$) in combination with a composite consisting essentially of between about 5 and about 95 weight percent of silica and between about 5 and about 95 weight percent of an oxide of at least one metal of groups IIIb and IVa of the periodic table. Generally, in such composite silica is present as the major component, preferably having associated therewith between about 8 and about 30 percent by weight of an oxide of the group IIIb or IVa metal. Representative of the latter metal oxides are alumina, hafnia, zirconia, titania and thoria. Of these, zirconia and alumina are accorded preference. It is also contemplated that more than one of such metal oxides may be contained in the catalyst utilized herein. Thus, the catalyst may consist essentially of molybdenum oxide in combination with a composite of silica-alumina, silica-zirconia, silica-hafnia, silica-thoria, silica-titania, silica-alumina-zirconia, silica-alumina-thoria, silica-zirconia-hafnia, silica-alumina-titania, etc.

Particularly useful as such composite in combination with molybdenum oxide, are those materials of synthetic or natural origin employed in catalytically cracking heavy petroleum oils to lighter materials boiling in the range of gasoline. Such siliceous cracking composites may be prepared by cogelation, coprecipitation or impregnation techniques well known in the art. Molybdenum oxide may be intimately combined with the above described composite in any suitable manner. It is preferred, however, to effect such combination by impregnation of the composite oxide base with the minor amount of molybdenum oxide specified hereinabove. Impregnation is suitably carried out in accordance with well known techniques by contacting the base with a solution of a molybdenum compound. Preferably, an aqueous impregnating solution of a water-soluble molybdenum compound, such as molybdic acid, is used in amount and concentration sufficient to deposit on the composite oxide base, after drying and calcination, the desired quantity of molybdenum oxide. After removal from contact with the impregnating solution, the resulting product is generally dried in air at a temperature within the approximate range of 220 to 350° F. and thereafter calcined at 850 to 1400° F.

The above catalysts are effective for conversion to alcohols of propylene, butenes and amylenes. No yield of product is obtained when ethylene is treated under conditions similar to those found effective for olefins of three to five carbon atoms. As the number of carbon atoms is increased above three, the yields are reduced to such an extent that the process is not found practicable for olefins of six or more carbon atoms.

It is of further interest to note that the catalytic effect of molybdenum oxide on the catalyst utilized herein appears to be quite specific. In this regard, other components generally considered to possess hydrogenation-dehydrogenation catalytic activity did not serve to increase the hydration activity of the siliceous composite oxide base for conversion of olefins to alcohols. On the contrary, it has been observed that certain of said components, for example, platinum when deposited on a siliceous composite oxide base actually caused a decrease in the hydration activity thereof.

In conducting the hydration reaction in accordance with the method of the invention, olefin vapor is contacted with the catalyst either continuously or batchwise under suitable conditions of temperature and pressure in the presence of a molar excess of water with respect to olefin. Conditions of temperature and pressure may be such that the water is partly in the liquid phase or wholly in the vapor phase. Since the present catalysts are active, in general, for promoting side reactions such as polymerization and hydrogen transfer, reaction conditions are chosen to produce the desired alcohol product with selectivities approaching 100 percent.

Catalytic hydration with the above catalysts may be conducted over a wide range of conditions. Usually, the temperature employed is within the approximate range of 350 to 700° F. and preferably between about 400 and about 500° F. The pressure employed depends on the temperature and the reaction phase desired. Pressures in the approximate range of 500 to 3000 p.s.i.g. are suitable with a pressure between about 1000 and about 1500 p.s.i.g. being preferred. The water to olefin mole ratio required in the reaction zone varies with the vapor phase and mixed phase operation. In general, the mole ratio of water to olefin reactant will be within the range of 2:1 to 50:1 with a mole ratio of between about 20:1 to 40:1 being preferred. Olefin space velocities are in general within the approximate range of 0.3 to 5 and preferably between about 0.3 and about 0.5 for optimum conversions. As utilized herein, space velocity refers to volumes of liquid feed per hour per volume of catalyst space.

The following examples will serve to illustrate the process of the invention without limiting the same:

Example 1

This example illustrates the promotional effect of molybdenum oxide for increasing the catalytic activity of a silica-alumina catalyst in hydrating propylene to isopropyl alcohol.

A synthetic silica-alumina composite of the type employed in catalyzing the cracking of heavy petroleum oils to lighter materials boiling in the range of gasoline and containing 75 percent by weight silica and 25 percent by weight alumina and such composite impregnated with molybdic acid to deposit thereon about 10 percent by weight molybdenum oxide ($MoO_3$) were compared under similar conditions in a tubular stainless steel reactor by passing propylene through a bed of 8 to 16 mesh (Tyler) catalyst.

Hydration conditions included a pressure of 1500 p.s.i.g.; a liquid hourly space velocity of 0.3 and a 35 to 1 mole ratio of water to propylene in the reactor zone at the temperature indicated below. Conversion reported as percent propylene refers to single pass conversion of propylene per pass to isopropyl alcohol. The results obtained are shown below:

| Run No. | Temp., °F. | Percent Propylene Conversion | |
|---|---|---|---|
| | | 75% silica, 25% alumina catalyst | 10% $MoO_3$ on 75% silica/ 25% alumina catalyst |
| 1 | 400 | 14.5 | 19.5 |
| 2 | 450 | 63.0 | 73.3 |
| 3 | 500 | 22.1 | 52.7 |

It will be evident from the above data that the molybdenum oxide-promoted silica-alumina catalyst afforded substantially higher conversions at each of the indicated temperatures as compared with the unpromoted catalyst.

Example 2

This example illustrates the promotional effect of molybdenum oxide for increasing the catalytic activity of a silica-zirconia catalyst in hydrating propylene to isopropyl alcohol.

A cogelled silica-zirconia composite containing 90 percent by weight silica and 10 percent by weight zirconia and such composite impregnated with molybdic acid to deposit thereon about 10 percent by weight molybdenum oxide ($MoO_3$) were compared under the conditions described in Example 1. The results obtained are shown below:

| Run No. | Temp., °F. | Percent Propylene Conversion | |
|---|---|---|---|
| | | 90% silica, 10% zirconia catalyst | 10% $MoO_3$ on 90% silica, 10% zirconia catalyst |
| 1 | 400 | 3.5 | 21 |
| 2 | 450 | 13 | 55 |
| 3 | 475 | 21 | 60 |
| 4 | 500 | 18 | 51 |

It will be seen from the foregoing data that the molybdenum oxide-promoted silica-zirconia catalyst in every instance afforded substantially higher conversions as compared with the unpromoted catalyst.

Example 3

This example illustrates the promotional effect of various amounts of molybdenum oxide deposited on a commercial silica-alumina cracking catalyst in hydrating propylene to isopropyl alcohol.

A synthetic silica-alumina composite of the type employed in catalyzing the cracking of heavy petroleum oils to lighter materials boiling in the range of gasoline and containing 75 percent by weight silica and 25 percent by weight alumina and samples of such composite having deposited thereon 5, 10 and 25 percent by weight of molybdenum oxide ($MoO_3$) were compared under similar conditions in a tubular stainless steel reactor by passing propylene through a bed of the catalyst.

Hydration conditions included a temperature of 450° F., a pressure of 1500 p.s.i.g.; a liquid hourly space velocity of 0.3 and a 35 to 1 mole ratio of water to propylene in the reactor zone. Conversion reported as percent propylene refers to single pass conversion of propylene per pass to isopropyl alcohol. The results obtained are shown below:

Percent $MoO_3$: Percent propylene conversion
0 ------------------------------------- 63.0
5 ------------------------------------- 73.3
10 ------------------------------------ 73.0
25 ------------------------------------ 79.0

It will be seen from the above data that the various amounts of deposited molybdenum oxide on silica-alumina in each instance afforded a substantial improvement in the conversion of propylene to isopropyl alcohol.

Example 4

This example illustrates the effect of zirconia content in hydrating propylene to isopropyl alcohol, utilizing a catalyst of 10 percent by weight molybdenum oxide ($MoO_3$) deposited on silica or a silica-zirconia base containing varying amounts of zirconia.

The catalysts were compared under the conditions described in Example 3. The results obtained are shown below:

Catalyst base: Percent propylene conversion
100% $SiO_2$ ------------------------- 21.4
95% $SiO_2$/5% $ZrO_2$ -------------- 11.9
90% $SiO_2$/10% $ZrO_2$ ------------- 55.0
75% $SiO_2$/25% $ZrO_2$ ------------- 37.9

It will be seen from the foregoing that optimum conversion of propylene to isopropyl alcohol was achieved under the specified conditions with a catalyst in which the silica-zirconia base contained about 10 percent by weight zirconia.

Example 5

This example illustrates the effect of alumina content in hydrating propylene to isopropyl alcohol, utilizing as the catalyst alumina and various silica-alumina composites containing varying amounts of alumina.

The catalysts were compared under the conditions described in Example 3. The results obtained are set forth below:

| Percent weight alumina: | Percent propylene conversion |
|---|---|
| 10 | 31.0 |
| 25 | 63.0 |
| 100 | 44.0 |

It will be seen from the foregoing that optimum conversion of propylene to isopropyl alcohol was achieved under the specified conditions with a silica-alumina base containing about 25 percent by weight alumina.

*Example 6*

This example illustrates that hydrogenation-dehydrogenation components, other than molybdenum oxide, such as platinum, do not increase the hydration activity of a silica-alumina catalyst base.

A synthetic silica-alumina composite of the type employed in catalyzing the cracking of heavy petroleum oils to lighter materials boiling in the range of gasoline and containing 75 percent by weight silica and 25 percent by weight alumina and such composite having deposited thereon 0.5 percent by weight of platinum were compared under similar conditions such as described in Example 3. The results obtained are set forth below:

| Catalyst: | Percent propylene conversion |
|---|---|
| 75% silica-25% alumina | 63.0 |
| 0.5% platinum on 75% silica-25% alumina | 41.0 |

It will be evident that the addition of platinum did not serve to increase the hydration activity of the silica-alumina base but, on the contrary, produced less conversion of propylene to isopropyl alcohol than the base alone.

It will be understood that the above description is merely illustrative of preferred embodiments of the invention, of which many variations may be made within the scope of the following claims by those skilled in the art without departing from the spirit thereof.

I claim:

1. A process for converting olefins of three to five carbon atoms into the corresponding alcohols by contacting such olefins in the presence of water, wherein the mole ratio of water to olefin reactant is within the range of 2:1 to 50:1 at a pressure between about 500 and about 3000 pounds per square inch gauge and a temperature between about 350° F. and about 700° F. with a catalyst consisting essentially of between about 0.5 and about 25 percent by weight of $MoO_3$ based on the finished catalyst in combination with a composite of silica and an oxide of at least one metal selected from the group consisting of metals of groups IIIb and IVa of the periodic table.

2. A process for converting olefins of three to five carbon atoms into the corresponding alcohols by contacting such olefins in the presence of water, wherein the mole ratio of water to olefin reactant is within the range of 2:1 to 50:1 at a pressure between about 500 and about 3000 pounds per square inch gauge and a temperature between about 350° F. and about 700° F. with a catalyst consisting essentially of between about 0.5 and about 25 percent by weight of $MoO_3$ based on the finished catalyst in combination with a composite consisting essentially of between about 5 and about 95 weight percent of silica and between about 5 and about 95 weight percent of an oxide of at least one metal selected from the group consisting of metals of groups IIIb and IVa of the periodic table.

3. A process for converting olefins of three to five carbon atoms in the corresponding alcohols by contacting such olefins in the presence of water, wherein the mole ratio of water to olefin reactant is within the range of 2:1 to 50:1 at a pressure between about 500 and about 3000 pounds per square inch gauge and a temperature between about 350° F. and about 700° F. with a catalyst consisting essentially of between about 0.5 and about 25 percent by weight of $MoO_3$ based on the finished catalyst in combination with a composite consisting essentially of between about 8 and about 30 percent by weight of an oxide of at least one metal selected from the group consisting of metals of groups IIIb and IVa of the periodic table and remainder silica.

4. A process for converting olefins of three to five carbon atoms into the corresponding alcohols by contacting such olefins in the presence of water, wherein the mole ratio of water to olefin reactant is within the range of 2:1 to 50:1 at a pressure between about 500 and about 3000 pounds per square inch gauge and a temperature between about 350° F. and about 700° F. with a catalyst consisting essentially of between about 0.5 and about 25 percent by weight of $MoO_3$ deposited on a composite of silica and alumina.

5. A process for converting olefins of three to five carbon atoms into the corresponding alcohols by contacting such olefins in the presence of water, wherein the mole ratio of water to olefin reactant is within the range of 2:1 to 50:1 at a pressure between about 500 and about 3000 pounds per square inch gauge and a temperature between about 350° F. and about 700° F. with a catalyst consisting essentially of between about 0.5 and about 25 percent by weight of $MoO_3$ deposited on a composite of silica and zirconia.

6. A process for converting propylene to isopropyl alcohol by contacting the same in the presence of water, wherein the mole ratio of water to olefin reactant is within the range of 2:1 to 50:1 at a pressure between about 500 and about 3000 pounds per square inch gauge and a temperature between about 350° F. and about 700° F. with a catalyst consisting essentially of between about 0.5 and about 25 percent by weight of $MoO_3$ deposited on a composite of silica and alumina.

7. A process for converting propylene to isopropyl alcohol by contacting the same in the presence of water, wherein the mole ratio of water to olefin reactant is within the range of 2:1 to 50:1 at a pressure between about 500 and about 3000 pounds per square inch gauge and a temperature between about 350° F. and about 700° F. with a catalyst consisting essentially of between about 0.5 and about 25 percent by weight of $MoO_3$ deposited on a composite of silica and zirconia.

8. A process for converting propylene to isopropyl alcohol by contacting the same in the presence of water, wherein the mole ratio of water to olefin reactant is within the range of 2:1 to 50:1 at a pressure between about 500 and about 3000 pounds per square inch gauge and a temperature between about 350° F. and about 700° F. with a catalyst consisting essentially of between about 0.5 and about 25 percent by weight of $MoO_3$ deposited on a composite consisting essentially of approximately 25 weight percent alumina and approximately 75 weight percent silica.

9. A process for converting propylene to isopropyl alcohol by contacting the same in the presence of water, wherein the mole ratio of water to olefin reactant is within the range of 2:1 to 50:1 at a pressure between about 500 and about 3000 pounds per square inch gauge and a temperature between about 350° F. and about 700° F. with a catalyst consisting essentially of between about 0.5 and about 25 percent by weight $MoO_3$ deposited on a composite consisting essentially of approximately 10 weight percent zirconia and approximately 90 weight percent silica.

References Cited in the file of this patent

UNITED STATES PATENTS

| 1,873,536 | Brown et al. | Aug. 23, 1932 |
| 1,986,882 | Dreyfus | Jan. 8, 1935 |

(Other references on following page)

UNITED STATES PATENTS

| | | |
|---|---|---|
| 2,658,924 | Lukasiewicz et al. | Nov. 10, 1953 |
| 2,663,744 | Lukasiewicz et al. | Dec. 22, 1953 |
| 2,739,133 | Schwarzenbek | Mar. 20, 1956 |
| 2,995,609 | Frech et al. | Aug. 8, 1961 |

OTHER REFERENCES

Hodgman et al.: "Handbook of Chemistry and Physics," Chemical Rubber Publishing Co., Cleveland, Ohio (1959–1960, 41st ed.) pages 448–449.)

Moeller: "Inorganic Chemistry," John Wiley and Sons, Inc., New York (1952), page 122.